United States Patent Office

2,945,881
Patented July 19, 1960

2,945,881

PRODUCTION OF ALKYLENES AND ALKANOL AMINE POLYACETATE SALTS

William P. Colman, Stamford, and Leonard A. Cullo, Norwalk, Conn., assignors to American Cyanamid Company, New York, N.Y., a corporation of Maine No Drawing. Filed Sept. 6, 1957, Ser. No. 682,319

5 Claims. (Cl. 260—534)

The present invention relates to the production of alkali metal salts of alkylene or alkanol amine polyacetic acids such as ethylenediaminetetraacetic acid. More specifically, it is concerned with an improved method of reacting an amine, particularly ethylenediamine, a cyanide and formaldehyde to obtain the product more readily and in better condition and yield.

Usage of alkylene or alkanol amine polyacetates, particularly of their alkali metal salts, is constantly increasing. Numerous production methods have been employed. One of the best is the "cyanide" process discussed for example, in United States Patent Nos. 2,387,735, 2,407,645 and 2,461,519. As shown therein, various proposals as to the manner, rate and quantity of reactant addition have been made. However, none of these proposals have been completely satisfactory in all respects, particularly for large scale production. Adequate process control is often difficult to maintain. Moreover, production usually has been unsatisfactory as to quantity, quality or both.

Production of tetrasodiumethylenediaminetetraacetic acid presents all the typical production problems. Accordingly, it will be taken as illustrative for the purpose of this discussion. For convenience, it will be abbreviated as SEDA. It is, therefore, a principal object of the present invention to develop a process for the production of SEDA and its chemical equivalents which is both well adapted for industrial use and capable of producing economically satisfactory yields.

In general, these objects have been accomplished in a surprisingly simple but effective procedure. The selected amine in the illustrative case ethylene diamine and sodium hydroxide are combined in hot aqueous solution. After an initial addition thereto of hydrocyanic acid, controlled amounts of hydrocyanic acid and formaldehyde are concomitantly added to this aqueous medium at rates such that an excess of cyanide over HCHO is always present. By-product ammonia is removed as it forms, preferably by water vapor evolved from the reaction medium.

This novel procedure is sufficiently flexible to be easily operated and controlled and may be carried out batchwise or continuously. However, certain precautions must be observed in order to obtain the product in the desired yields and satisfactorily free of objectionable color. These precautions are noted in the following discussion.

In a typical production of SEDA, by the process of the present invention, an aqueous solution of sodium hydroxide and ethylenediamine are charged to a suitable reaction vessel. This charge will usually contain from about 50% to about 80% water. It is an advantage of the present invention that it is neither necessary nor desirable to pre-neutralize all of the HCN. Therefore, as noted above, to the initial aqueous solution, at reaction temperature, is added an initial feeding of HCN, usually comprising some one-third or more of the total to be used. Thereafter HCN and HCHO are concomitantly fed. Since thorough agitation is necessary, provision in the reactor for mechanical stirring is highly desirable.

The amount of water used has been discussed above. In addition thereto, the quantities of other reagents should also be controlled. Considerable latitude is permissible however, and successful results are obtainable by operation within the ranges of reactant quantities in the following table.

| Reactant: | Mols/mol diamine |
|---|---|
| $NH_2CH_2CH_2NH_2$ | 1.0 |
| NaOH | 4.1–5.1 |
| HCN | 4.05–5.05 |
| HCHO | 4.0–5.0 |

Although the amounts of NaOH, HCN and HCHO are variable with the general limits shown above, a particular operation requires the observation of certain further precautions.

At any one time, the NaOH in solution must be in excess of the HCN. However, the amount of excess is not critical. Therefore, it is an advantage of the present process that it is neither necessary nor advantageous, as in previous processes to maintain a constant degree of alkalinity with great care. Moreover, it is also unnecessary, as it was that the alkali cyanide concentration be held constant. Neither the exact pH nor the exact alkali cyanide concentration is critical at any one time. Accordingly, all the caustic is added at the outset and the alkalinity allowed to develop at random to the end of the cycle. At this stage, the pH is usually about 11–12.

However, even if the exact concentrations are not critical at any one point, maintaining the NaOH content in excess of the HCN is necessary. For that reason, it will be noted that the useful NaOH mol range in the preceding table is shown as from about 4.1 to about 5.1; but the HCN range is slightly lower, or from about 4.05 to about 5.05. In selecting the amounts to be used from these ranges, a larger amount of NaOH than of HCN always should be selected for any one operation.

A feature of the present invention is the absence of excessive color in the product. However, if at any stage in the cycle, the HCHO content of the mixture appreciably exceeds the cyanide concentration, this advantage is impaired. Therefore, within the general ranges shown in the table above, the cyanide ion concentration at any one time should be maintained at least 0.05 mol per mol of amine in excess over the HCHO.

As noted above, ammonia forms during the reaction and is continuously removed, preferably by evolving water vapor. For this reason, it is desirable to maintain the reaction mixture at the boiling point. In the past, it has been considered essential to employ reduced pressure and maintain a reaction temperature below 100° C. It is an advantage of the process of the present invention that this, too, is neither necessary nor desirable. The present process is readily operated at the atmospheric boiling point. This is above 100° C. and may be as high as about 120° C. or higher, but usually will not exceed about 110° C. It is a further advantage that under these conditions the heat input is easily controlled to maintain the desired rate of water vapor evolution.

As also noted above, reaction is usually initiated by feeding an initial quantity of HCN. Within the limits discussed above, this should comprise some 30% or more of the total HCN to be used. Thereafter HCHO is added along with additional HCN. In good practice, it is preferable to feed about 30–35% of the total HCN before starting HCHO addition. Thereafter, the remaining HCN and HCHO are simultaneously added.

In the preferred practice, this may be stepwise or continuous but some excess of HCN over HCHO must be maintained until all the HCN is added. The preferred rates are such that in batch operation some 75–85% of the HCHO is fed by the time all the HCN has been added. If so desired, this may be even higher so long as no excess of HCHO over HCN is allowed to develop. In continuous operation, the same general proportions will be satisfactory. In the former case, the balance of the HCHO will be fed after HCN addition is stopped and the heating and agitation is continued until reaction ceases. In either case, if necessary or desirable, liquor can be withdrawn and any excess cyanide reacted subsequently.

As the HCN and HCHO reactants, liquid HCN and aqueous 35-37% formaldehyde are preferred. However, these are not critical limitations. If more dilute formaldehyde or HCN liquors are used, the water content of the original charge of NaOH and amine and/or the rate of water evolution should be adjusted accordingly.

Although the HCN and HCHO feed rates need not be precisely controlled, extreme fluctuations should be avoided. Localized high concentrations of either may be detrimental to product quality. Moreover, due to maintaining the above-noted excess of cyanide over HCHO, the resultant product will and should contain some cyanide. This may be as little as 0.01% or as high as 5%, or more. However, the higher amounts should be avoided and in good practice the range will be about 0.1 to about 1.0% NaCN. For this reason, the total amounts of HCN and HCHO fed should be as accurate as practicable, preferably within about one percent.

During reaction, the heat input should be regulated to evolve the correct amount of water. This in good practice, should be such that the non-aqueous content of the reacting mixture is maintained from about 40% to about 60%. In exceeding about 55% total solids, the mixture becomes rapidly and progressively more viscous and above about 65% solids separate from solution. The active products solids content of these liquors will be somewhat less.

Commercially, the desired end product is usually an aqueous solution containing some 35% to 45%, normally about 38-40% SEDA. To assist in obtaining this result, certain precautions are desirable during the heating period, particularly after HCHO addition is completed. In this latter stage, in different operations, the liquor may contain varied amounts of dissolved solids, including the product and the small NaCN excess noted above. Complete reaction and ammonia removal is necessary. Accordingly, heating and water vapor evolution is usually continued through this stage and at the same time the water content is brought to the desired value.

After reaction and ammonia removal is completed, the resultant product solution may be used as such for many purposes. If necessary or desirable, it may be further refined. For example, it may be treated with activated carbon, or the like to reduce color. The small amount of excess cyanide may be reduced or eliminated by known procedures. It may be filtered and the active salt content adjusted, if necessary. If the dry salt is desired, it may be isolated by known means.

The process of the invention will be further illustrated in conjunction with the following example which is intended for that purpose and not by way of limitation.

*Example*

To a reactor equipped with a mechanical stirrer, vapor outlet and condenser is charged 215 lbs. of 50% aqueous caustic soda, 236 lbs. of water and 39.5 lbs. of ethylene diamine (85% grade). Thereto is added about 23 lbs. of acid-stabilized liquid HCN at about 0.5 lb./min. Thereafter, at the same rate about 47 lbs. of HCN is charged together with about 160 lbs. of 37% aqueous formaldehyde (methanol-stabilized) added at about 1.67 lbs./min. Thereafter, the HCN feed is stopped, the feed line is water flushed, and about 40 lbs. of formaldehyde solution is added. Throughout the formaldehyde addition, sufficient heat is furnished to evolve water at the rate of about 1.7 to about 2.0 lbs./min., while the by-product ammonia is removed from the system. A sample is removed and assay shows about 0.5% NaCN and a 38% content of SEDA, indicating a yield of about 95%.

Heating is continued for about an hour at a rate sufficient to evolve 1.7-2.0 lbs./min. of $H_2O$, sufficient water being added to produce a solution containing about 39% SEDA at the end of the reaction. Resultant solution, after cooling has a satisfactory color.

While the above process has been described with respect to the formation of the tetrasodium salt of ethylenediaminetetraacetic acid, it is equally as applicable to the formation of any tetra alkali metal salt of said acid. In carrying out the process according to the present invention, yields of above 90% and usually from 95 to 97% are consistently obtained.

While the foregoing discussion has detailed only the production of SEDA, analagous compounds are also prepared by the foregoing procedure by substituting for the ethylenediamine equivalent amounts of a different alkylene amine or of an alkanol amine such as propylenediamine, diethylenetriamine, N-aminoethylethanolamine, and the like. The equivalent amount of such amines is determined by the number of available amino hydrogen atoms. For example, 4/3 mols of N-aminoethylethanolamine, which has three available amino hydrogen atoms, is substituted for each mol of ethylenediamine.

We claim:

1. A process of producing alkali metal salts of ethylenediaminetetraacetic acid in good yield and free of objectionable color which comprises: forming a reaction medium comprising from about 50% to about 80% water having dissolved therein ethylene diamine and an alkali metal hydroxide, said amine and hydroxide being in a mol ratio range of about 1.0:4.1-5.1; adding thereto an amount of HCN and a lesser amount of formaldehyde so as to provide total mol ratios to amine within the ranges of 1:4.05-5.05 and 1:4.0-5.0, respectively; said additions being made in a manner so that at least about 30% of said HCN is added prior to any formaldehyde addition and the remaining HCN and the formaldehyde are concomitantly added at such rates as to maintain an excess of cyanide over formaldehyde; and maintaining the reaction medium at atmospheric boiling temperature greater than about 100° C. and less than about 120° C. to substantially complete the reaction and evolve water vapor whereby a resulting reaction mass having a total solids content of about 40 to about 60% is obtained; the total amounts of alkali metal hydroxide, HCN and formaldehyde added being such as to provide an alkali cyanide concentration in said resulting reaction mass of about 0.1-1.0%.

2. A process according to claim 1 in which the alkali metal hydroxide is NaOH.

3. A process according to claim 2 in which the amount of HCN added prior to any formaldehyde addition is about 30-35% of the total and the amount of formaldehyde added by completion of HCN addition is about 75-85% of the total.

4. A process according to claim 2 in which during water vapor evolution but after addition of formaldehyde is complete water is supplied at a sufficient rate to produce a final active product solids content of from about 35% to about 45%.

5. A process according to claim 2 wherein the reaction temperature and the water vapor evolution rate are maintained sufficiently high to evolve ammonia during reaction at substantially the same rate at which said ammonia forms and said evolved ammonia and water vapor are withdrawn from the system.

References Cited in the file of this patent

UNITED STATES PATENTS

| 2,387,735 | Bersworth | Oct. 30, 1945 |
| 2,461,519 | Bersworth | Feb. 15, 1949 |

OTHER REFERENCES

Smith et al.: J. Org. Chem., vol. 14 (1949), pp. 355-60.